(12) United States Patent
Yang et al.

(10) Patent No.: US 11,587,352 B2
(45) Date of Patent: Feb. 21, 2023

(54) FINGERPRINT DETECTION CONTROL CIRCUIT, FINGERPRINT DETECTION CONTROL METHOD AND DISPLAY DEVICE

(71) Applicants: BEIJING BOE DISPLAY TECHNOLOGY CO., LTD., Beijing (CN); BOE TECHNOLOGY GROUP CO., LTD., Beijing (CN)

(72) Inventors: Xinlan Yang, Beijing (CN); Wenkai Mu, Beijing (CN); Yi Liu, Beijing (CN); Shijun Wang, Beijing (CN); Jun Fan, Beijing (CN); Bo Feng, Beijing (CN); Yang Wang, Beijing (CN); Zhan Wei, Beijing (CN); Tengfei Ding, Beijing (CN); Yingzi Wang, Beijing (CN)

(73) Assignees: BEIJING BOE DISPLAY TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 120 days.

(21) Appl. No.: 17/413,839

(22) PCT Filed: Sep. 10, 2020

(86) PCT No.: PCT/CN2020/114292
§ 371 (c)(1),
(2) Date: Jun. 14, 2021

(87) PCT Pub. No.: WO2022/051954
PCT Pub. Date: Mar. 17, 2022

(65) Prior Publication Data
US 2022/0309824 A1  Sep. 29, 2022

(51) Int. Cl.
*G06V 40/13* (2022.01)

(52) U.S. Cl.
CPC .............................. *G06V 40/1318* (2022.01)

(58) Field of Classification Search
None
See application file for complete search history.

(56) References Cited

U.S. PATENT DOCUMENTS

| 2021/0303815 A1* | 9/2021 | Chung | G06V 40/1365 |
| 2022/0012454 A1* | 1/2022 | Lin | G06F 3/0446 |
| 2022/0027596 A1* | 1/2022 | Lo | G06V 40/1318 |
| 2022/0171494 A1* | 6/2022 | Shih | G09G 3/20 |

* cited by examiner

*Primary Examiner* — Joseph R Haley
(74) *Attorney, Agent, or Firm* — Brooks Kushman P.C.

(57) ABSTRACT

A fingerprint detection control circuit, a fingerprint detection control method and a display device. The fingerprint detection control circuit includes a sensing circuitry, a resetting circuitry, a control circuitry and a conversion circuitry. The control circuitry provides a switch control signal to a control end of the resetting circuitry under the control of a first control signal. The resetting circuitry provides a resetting voltage to a conversion control end under the control of a potential at its control end. The conversion circuitry converts a photovoltage signal into a corresponding current signal under the control of a potential at the conversion control end when a first voltage end is electrically connected to a first signal output end, and outputs the current signal via the first signal output end.

20 Claims, 3 Drawing Sheets

FINGERPRINT DETECTION CONTROL CIRCUIT, FINGERPRINT DETECTION CONTROL METHOD AND DISPLAY DEVICE

CROSS-REFERENCE TO RELATED APPLICATION

This application is the U.S. national phase of PCT Application No. PCT/CN2020/114292 filed on Sep. 10, 2020, which is incorporated herein by reference in its entirety.

TECHNICAL FIELD

The present disclosure relates to the field of fingerprint detection technology, in particular to a fingerprint detection control circuit, a fingerprint detection control method and a display device.

BACKGROUND

Recently, along with the rapid development of the technology, mobile products with a biometric identification function has gradually emerged in our lives and work. Due to such a feature as unique identity, a fingerprint identification technology has attracted more and more attentions. However, a conventional optical fingerprint detection control circuitry has a short period of validity for fingerprint identification.

SUMMARY

In a first aspect, the present disclosure provides in some embodiments a fingerprint detection control circuit, including a sensing circuitry, a resetting circuitry, a control circuitry and a conversion circuitry. The sensing circuitry is electrically connected to a conversion control end, and configured to convert a received optical signal into a photovoltage signal and provide the photovoltage signal to the conversion control end. The control circuitry is electrically connected to a first control line, a switch control signal end and a control end of the resetting circuitry, and configured to provide a switch control signal from the switch control signal end to the control end of the resetting circuitry under the control of a first control signal on the first control line. The control end of the resetting circuitry is electrically connected to a resetting control voltage end. The resetting circuitry is electrically connected to a resetting voltage end and the conversion control end, and configured to provide a resetting voltage from the resetting voltage end to the conversion control end under the control of a potential at the control end of the resetting circuitry. A control end of the conversion circuitry is electrically connected to the conversion control end. The conversion circuitry is electrically connected to a first voltage end and a first signal output end, and configured to control the first voltage end to be electrically connected to or electrically disconnected from the first signal output end under the control of a potential at the conversion control end, convert the photovoltage signal into a corresponding current signal when the first voltage end is electrically connected to the first signal output end, and output the current signal via the first signal output end.

In a possible embodiment of the present disclosure, the fingerprint detection control circuit further includes an output circuitry electrically connected to an output control end, the first signal output end and a second signal output end, and configured to control the first signal output end to be electrically connected to or electrically disconnected from the second signal output end under the control of an output control signal from the output control end.

In a possible embodiment of the present disclosure, the sensing circuitry further includes a photovoltaic conversion sub-circuitry and a storage sub-circuitry connected in parallel to each other, a first end of the photovoltaic conversion sub-circuitry and a first end of the storage sub-circuitry are electrically connected to a bias voltage end, and a second end of the photovoltaic conversion sub-circuitry and a second end of the storage sub-circuitry are electrically connected to the conversion control end. The photovoltaic conversion sub-circuitry is configured to convert a received optical signal into a photocurrent signal, and charge or discharge the storage sub-circuitry through the photocurrent signal to change the potential at the conversion control end.

In a possible embodiment of the present disclosure, the control circuitry includes a control transistor, a control electrode of which is electrically connected to the first control line, a first electrode of which is electrically connected to the switch control signal end, and a second electrode of which is electrically connected to the control end of the resetting circuitry. The switch control signal end is configured to provide the switch control signal.

In a possible embodiment of the present disclosure, the resetting circuitry includes a resetting transistor, a control electrode of which is electrically connected to the control end of the resetting circuitry, a first electrode of which is electrically connected to the resetting voltage end, and a second electrode of which is electrically connected to the conversion control end.

In a possible embodiment of the present disclosure, the conversion circuitry includes a conversion transistor, a control electrode of which is electrically connected to the conversion control end, a first electrode of which is electrically connected to the first voltage end, and a second electrode of which is electrically connected to the first signal output end.

In a possible embodiment of the present disclosure, the output circuitry includes an output transistor, a control electrode of which is electrically connected to the output control end, a first electrode of which is electrically connected to the first signal output end, and a second electrode of which is electrically connected to the second signal output end.

In a possible embodiment of the present disclosure, the photovoltaic conversion sub-circuitry includes a photodiode, the storage sub-circuitry includes a storage capacitor, an anode of the photodiode is electrically connected to the bias voltage end, a cathode of the photodiode is electrically connected to the conversion control end, a first end of the storage capacitor is electrically connected to the bias voltage end, and a second end of the storage capacitor is electrically connected to the conversion control end.

In a second aspect, the present disclosure provides in some embodiments a fingerprint detection control method for the above-mentioned fingerprint detection control circuit, including, at a discharging phase, providing, by the control circuitry, a switch control signal to the control end of the resetting circuitry under the control of a first control signal on the first control line, and providing, by the resetting circuitry, a resetting voltage to the conversion control end under the control of a potential at the control end of the resetting circuitry, so that the conversion circuitry controls the first voltage end to be electrically disconnected from the first signal output end under the control of a potential at the conversion control end.

In a possible embodiment of the present disclosure, a fingerprint detection phase is followed by the discharging phase.

In a possible embodiment of the present disclosure, the sensing circuitry includes a photodiode and a storage capacitor connected in parallel to each other, and the fingerprint detection control method further includes, at the discharging phase, controlling a bias voltage from the bias voltage end, to enable a potential at the anode of the photodiode to be equal to a potential at the cathode of the photodiode.

In a possible embodiment of the present disclosure, the fingerprint detection control circuit further includes an output circuitry, the fingerprint detection phase includes a resetting time period, a photovoltaic conversion time period and a reading time period arranged sequentially, and the reading time period is followed by the discharging phase. The fingerprint detection control method includes: at the fingerprint detection phase, enabling, by the control circuitry, the switch control signal end to be electrically disconnected from the control end of the resetting circuitry under the control of the first control signal; within the resetting time period, providing, by the resetting circuitry, a resetting voltage from the resetting voltage end to the conversion control end under the control of a resetting control voltage from the resetting control voltage end; within the photovoltaic conversion time period, stopping, by the resetting circuitry, providing the resetting voltage to the conversion control end under the control of the resetting control voltage, and converting, by the sensing circuitry, a received optical signal into an photovoltage signal and providing the photovoltage signal to the conversion control end; and within the reading time period, controlling, by the conversion circuitry, the first voltage end to be electrically connected to the first signal output end under the control of a potential at the conversion control end, converting the photovoltage signal into a corresponding current signal, and outputting the current signal via the first signal output end, and controlling, by the output circuitry, the first signal output end to be electrically connected to the second signal output end under the control of an output control signal to output the current signal via the second signal output end.

In a third aspect, the present disclosure provides in some embodiments a display device including the above-mentioned fingerprint detection control circuit.

DETAILED DESCRIPTION

Figure 1:
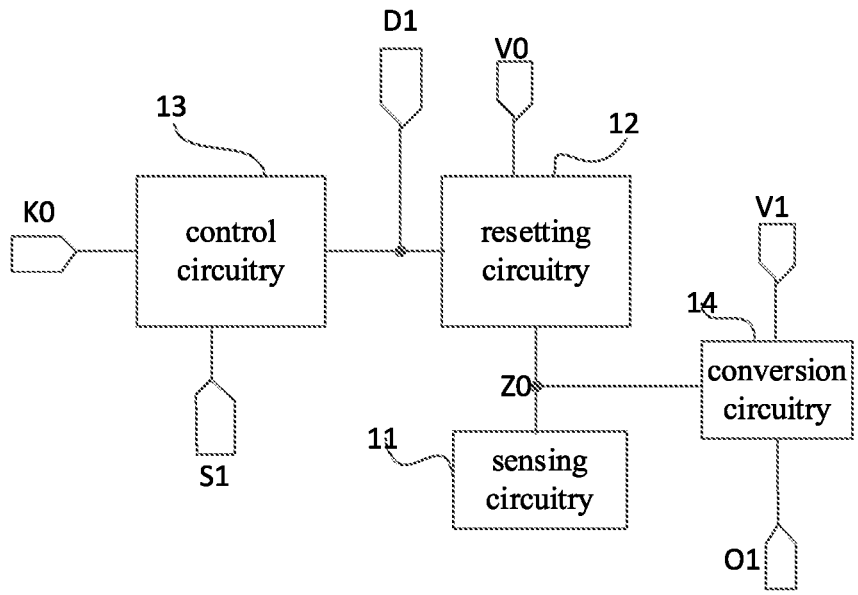
FIG. 1 is a schematic view showing a fingerprint detection control circuit according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, each transistor maybe a triode, a thin film transistor (TFT), a field effect transistor (FET), or any other element having a same characteristic. In order to differentiate two electrodes of the transistor, apart from a control electrode, from each other, one of the two electrodes may be called as a first electrode, and the other may be called as a second electrode.

In actual use, when the transistor is a triode, the control electrode may be a base, the first electrode may be a collector and the second electrode may be an emitter, or the control electrode may be a base, the first electrode may be an emitter and the second electrode may be a collector.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

The present disclosure provides in some embodiments a fingerprint detection control circuit, which includes a sensing circuitry 11, a resetting circuitry 12, a control circuitry 13 and a conversion circuitry 14. The sensing circuitry 11 is electrically connected to a conversion control end Z0, and configured to convert a received optical signal into a photovoltage signal and provide the photovoltage signal to the conversion control end Z0. The control circuitry 13 is electrically connected to a first control line Si, a switch control signal end KO and a control end of the resetting circuitry 12, and configured to provide a switch control signal from the switch control signal end KO to the control end of the resetting circuitry 12 under the control of a first control signal on the first control line Si. The control end of the resetting circuitry 12 is electrically connected to a resetting control voltage end D1. The resetting circuitry 12 is electrically connected to a resetting voltage end V0 and the conversion control end Z0, and configured to provide a resetting voltage from the resetting voltage end V0 to the conversion control end Z0 under the control of a potential at the control end of the resetting circuitry 12. A control end of the conversion circuitry 14 is electrically connected to the conversion control end Z0. The conversion circuitry 14 is further electrically connected to a first voltage end V1 and a first signal output end O1, and configured to control the first voltage end V1 to be electrically connected to or electrically disconnected from the first signal output end O1 under the control of a potential at the conversion control end Z0, convert the photovoltage signal into a corresponding current signal when the first voltage end V1 is electrically connected to the first signal output end O1, and output the current signal via the first signal output end O1.

According to the fingerprint detection control circuit in the embodiments of the present disclosure, the control circuitry 13 may provide the switch control signal to the control end of the resetting circuitry 12 under the control of the first control signal, and the setting circuitry 12 may provide the resetting voltage to the conversion control end Z0 under the control of the potential at its control end, so that the conversion circuitry 14 may control the first voltage end V1 to be electrically disconnected from the first signal output end O1 under the control of the potential at the conversion control end Z0. At this time, a conversion transistor of the conversion circuitry 14 may not be turned on in the case of no fingerprint detection. As a result, it is able to prevent the occurrence of a characteristic drift for the conversion transistor, thereby to ensure the performance of the conversion transistor and prolong a period of validity for the fingerprint identification.

In addition, during the operation of the fingerprint detection control circuit in the embodiments of the present disclosure, the sensing circuit may include a photodiode and a storage capacitor connected in parallel to each other. At a discharging phase, a bias voltage from a bias voltage end may be controlled, so as to enable a potential at an anode of the photodiode to be equal to a potential at a cathode of the photodiode, thereby to disable the photodiode. In this way, it is able to ensure the performance of the photodiode, and prolong the period of validity for the fingerprint identification.

Figure 2:
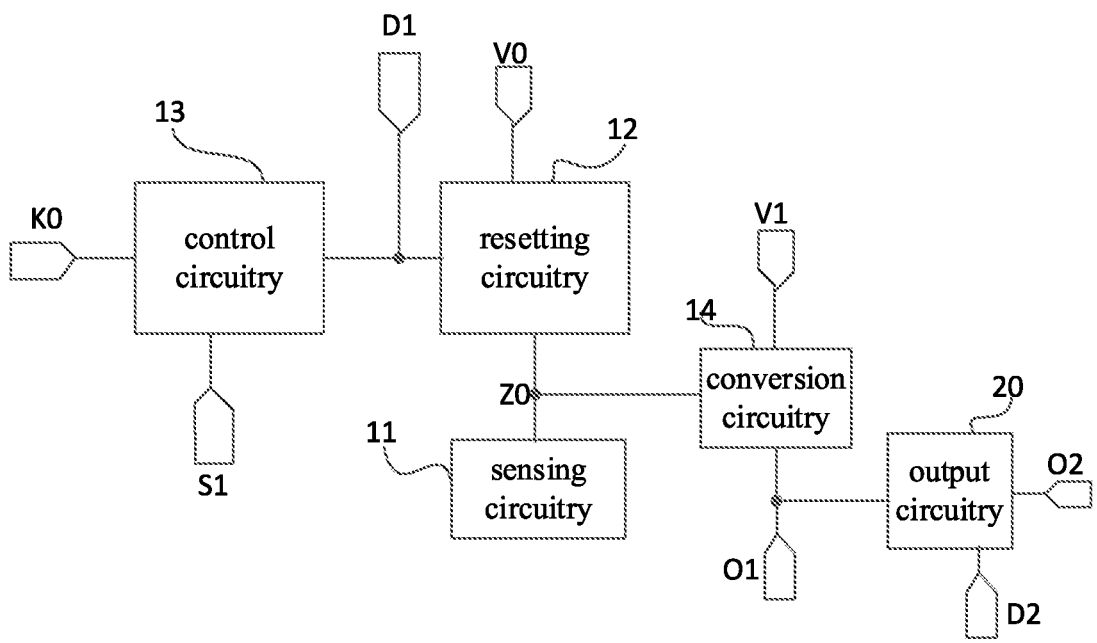
FIG. 2 is another schematic view showing the fingerprint detection control circuit according to one embodiment of the present disclosure.

As shown in FIG. 2, on the basis of the fingerprint detection control circuit in FIG. 1, the fingerprint detection control circuit may further include an output circuitry 20 electrically connected to an output control end D2, the first signal output end O1 and a second signal output end O2, and configured to control the first signal output end O1 to be electrically connected to or electrically disconnected from the second signal output end O2 under the control of an output control signal from the output control end D2.

In the embodiments of the present disclosure, during the operation of the fingerprint detection control circuit in FIG. 2, a fingerprint detection phase may include a resetting time period, a photovoltaic conversion time period and a reading time period arranged sequentially, and the reading time period may be followed by the discharging phase.

At the fingerprint detection phase, the control circuitry 13 may control the switch control signal end KO to be electrically disconnected from the control end of the resetting circuitry 12 under the control of the first control signal, and stop providing the switch control signal to the control end of the resetting circuitry 12.

Within the resetting time period, the resetting circuitry 12 may provide the resetting voltage from the resetting voltage end V0 to the conversion control end Z0 under the control of a resetting control voltage from the resetting control voltage D1.

Within the photovoltaic conversion time period, the resetting circuitry 12 may stop providing the resetting voltage to the conversion control end Z0 under the control of the resetting control voltage, and the sensing circuitry 11 may convert the received optical signal into the photovoltage signal and provide the photovoltage signal to the conversion control end Z0.

Within the reading time period, the conversion circuitry 14 may control the first voltage end V1 to be electrically connected to the first signal output end O1 under the control of the potential at the conversion control end Z0, convert the photovoltage signal into the corresponding current signal, and output the current signal via the first signal output end O1. The output circuitry 20 may control the first signal output end O1 to be electrically connected to the second signal output end O2 under the control of the output control signal, so as to output the current signal via the second signal output end O2.

Figure 3:
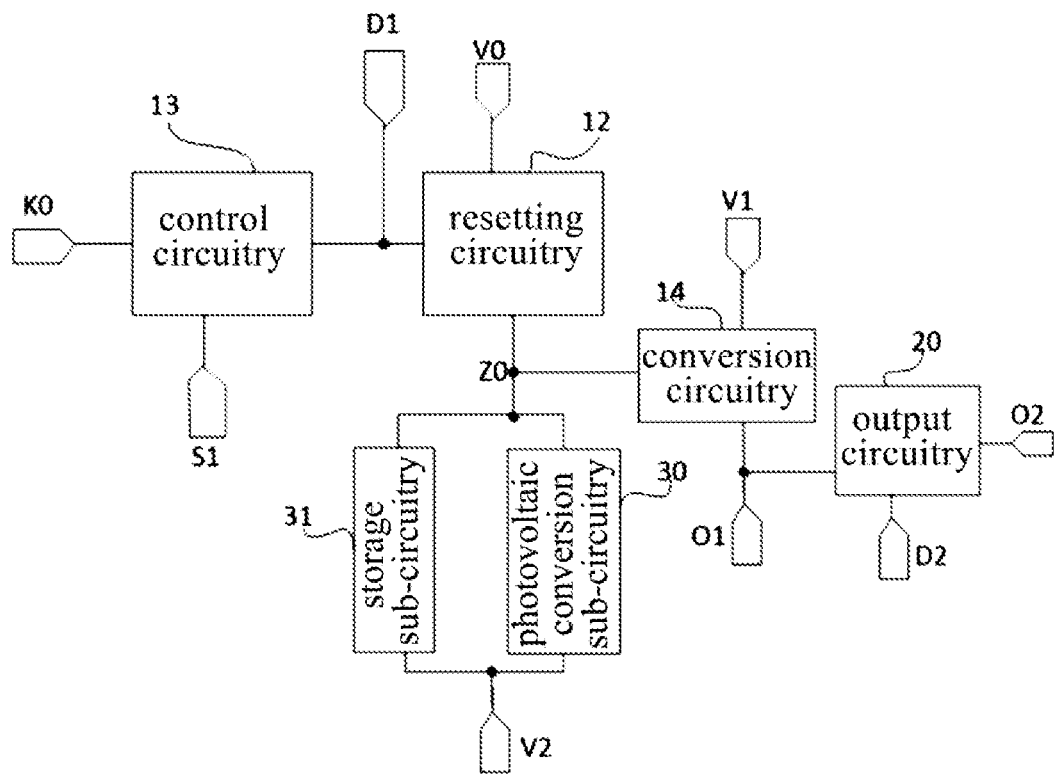
FIG. 3 is still another schematic view showing the fingerprint detection control circuit according to one embodiment of the present disclosure.

As shown in FIG. 3, on the basis of the fingerprint detection control circuit in FIG. 2, the sensing circuitry 11 may include a photovoltaic conversion sub-circuitry 30 and a storage sub-circuitry 31 connected in parallel to each other. A first end of the photovoltaic conversion sub-circuitry 30 and a first end of the storage sub-circuitry 31 may be electrically connected to a bias voltage end V2, and a second end of the photovoltaic conversion sub-circuitry 30 and a second end of the storage sub-circuitry 31 may be electrically connected to the conversion control end Z0. The photovoltaic conversion sub-circuitry 30 is configured to convert a received optical signal into a photocurrent signal, and charge or discharge the storage sub-circuitry 31 through the photocurrent signal to change the potential at the conversion control end Z0.

In the embodiments of the present disclosure, the sensing circuitry 11 may include the photovoltaic conversion sub-circuitry 30 and the storage sub-circuitry 31 connected in parallel to each other. The photovoltaic conversion sub-circuitry 30 may convert the received optical signal into the photocurrent signal, and charge or discharge the storage sub-circuitry 31 through the photocurrent signal, so as to change the potential at the conversion control end Z0.

In a possible embodiment of the present disclosure, the control circuitry may include a control transistor, a control electrode of which is electrically connected to the first control line, a first electrode of which is electrically connected to the switch control signal end, and a second electrode of which is electrically connected to the control end of the resetting circuitry. The switch control signal end is configured to provide the switch control signal.

In a possible embodiment of the present disclosure, the resetting circuitry may include a resetting transistor, a control electrode of which is electrically connected to the control end of the resetting circuitry, a first electrode of which is electrically connected to the resetting voltage end, and a second electrode of which is electrically connected to the conversion control end.

In some embodiments of the present disclosure, the conversion circuitry may include a conversion transistor, a control electrode of which is electrically connected to the conversion control end, a first electrode of which is electrically connected to the first voltage end, and a second electrode of which is electrically connected to the first signal output end.

In a possible embodiment of the present disclosure, the output circuitry may include an output transistor, a control electrode of which is electrically connected to the output control end, a first electrode of which is electrically connected to the first signal output end, and a second electrode of which is electrically connected to the second signal output end.

During the implementation, the photovoltaic conversion sub-circuitry may include a photodiode, and the storage sub-circuitry may include a storage capacitor. An anode of the photodiode may be electrically connected to the bias voltage end, a cathode of the photodiode may be electrically connected to the conversion control end, a first end of the storage capacitor may be electrically connected to the bias voltage end, and a second end of the storage capacitor may be electrically connected to the conversion control end.

Figure 4:
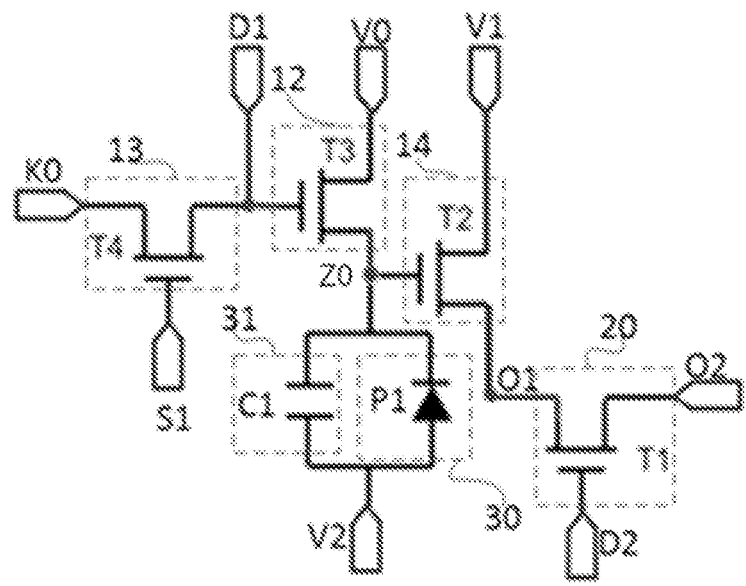
FIG. 4 is a circuit diagram of the fingerprint detection control circuit according to one embodiment of the present disclosure.

As shown in FIG. 4, the fingerprint detection control circuit in the embodiments of the present disclosure may include the sensing circuitry, the resetting circuitry 12, the control circuitry 13, the conversion circuitry 14 and the output circuitry 20. The sensing circuitry may include the photovoltaic conversion sub-circuitry 30 and the storage sub-circuitry 31.

The control circuitry 13 may include a control transistor T4 and the resetting circuitry 12 may include a resetting transistor T3. A gate electrode of the control transistor T4 may be electrically connected to the first control line Si, a source electrode thereof may be electrically connected to the switch control signal end KO, and a drain electrode thereof may be electrically connected to a gate electrode of the resetting transistor T3. The switch control signal end KO is configured to provide the switch control signal. The gate electrode of the resetting transistor T3 may be electrically connected to the resetting control voltage end D1, a source electrode thereof may be electrically connected to the resetting voltage end V0, and a drain electrode thereof may be electrically connected to the conversion control end Z0.

The conversion circuitry 14 may include a conversion transistor T2, a gate electrode of which is electrically connected to the conversion control end Z0, a source electrode of which is electrically connected to the first voltage end V1, and a drain electrode of which is electrically connected to the first signal output end O1.

The output circuitry 20 may include an output transistor T1, a gate electrode of which is electrically connected to the output control end D2, a source electrode of which is electrically connected to the first signal output end O1, and a drain electrode of which is electrically connected to the second signal output end O2.

The photovoltaic conversion sub-circuitry 30 may include a photodiode P1, and the storage sub-circuitry 31 may include a storage capacitor C1. An anode of the photodiode P1 may be electrically connected to the bias voltage end V2, and a cathode thereof may be electrically connected to the conversion control end Z0. A first end of the storage capacitor C1 may be electrically connected to the bias voltage end V2, and a second end thereof may be electrically connected to the conversion control end Z0.

In the fingerprint detection control circuit in FIG. 4, all the transistors may be, but not limited to, n-type TFTs.

In the fingerprint detection control circuit in FIG. 4, the switch control signal end KO may provide, but not limited to, a high voltage signal, and the first voltage end V1 may provide, but not limited to, a high voltage signal.

Figure 5:
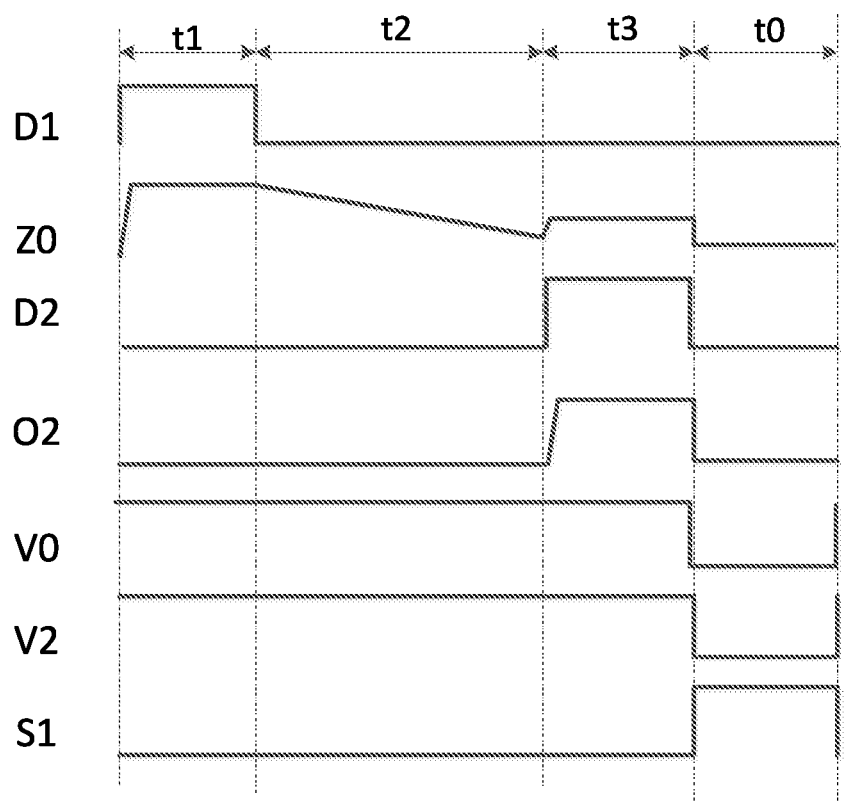
FIG. 5 is a sequence diagram of the fingerprint detection control circuit in FIG. 4.

As shown in FIG. 5, during the operation of the fingerprint detection control circuit in FIG. 4, a fingerprint detection phase may include a resetting time period t1, a photovoltaic conversion time period t2 and a reading time period t3 arranged sequentially, and a discharging phase t0 may follow the fingerprint detection phase.

Within the resetting time period t1, the resetting control voltage end D1 may provide a high voltage signal, D2 may provide a low voltage signal, V0 may provide a high voltage signal, and Si may provide a low voltage signal, so as to turn on T3, and turn off T4, thereby to write the high voltage signal from V0 to Z0. At this time, a potential at Z0 may be greater than a potential of the voltage signal from V2, so that P1 may be in a reversely biased state. Hence, at the beginning of the photovoltaic conversion time period t2, P1 may perform photovoltaic conversion. In addition, T1 may be turned off, so that O2 may output a low voltage.

Within the photovoltaic conversion time period t2, D1 may provide a low voltage signal, D2 may provide a low voltage signal, V0 may provide a high voltage signal, and Si may provide a low voltage signal, so as to turn off T4 and T3, thereby to stop providing the resetting voltage to the conversion control end Z0. P1 may convert the received optical signal into a corresponding photocurrent, and the photocurrent may flow from the cathode of P1 to the anode of P1 to discharge C1 and reduce the potential at Z0. In addition, T1 may be turned off, so that O2 may output the low voltage continuously. Within the photovoltaic conversion time period t2, a voltage signal of Z0 may be just the photovoltage signal acquired through conversion.

Within the reading time period t3, D1 may provide a low voltage signal, D2 may provide a high voltage signal, and Si may provide a low voltage signal, so as to turn off T4 and T3, and turn on T1. The photovoltage signal may be converted by T2 into a corresponding current signal, and then the current signal may be outputted via O2.

At the discharging phase t0, D1 may provide a low voltage signal, D2 may provide a low voltage signal, Si may provide a high voltage signal, and KO may provide a high voltage signal, so as to turn on T4 and provide the high voltage signal from KO to the gate electrode of T3, thereby to turn on T3. In addition, V0 may provide a low voltage signal, and the low voltage signal from V0 may be provided to Z0, so as to turn off T2, thereby to prevent the occurrence of a characteristic drift for T2 at the discharging phase t0. Further, V2 may provide a low voltage signal and the potential at the anode of P1 may be equal to the potential at the cathode of P1, so as to disable P1 and ensure the performance of P1.

The present disclosure further provides in some embodiments a fingerprint detection control method for the above-mentioned fingerprint detection control circuit, which includes, at a discharging phase, providing, by the control circuitry, a switch control signal to the control end of the resetting circuitry under the control of a first control signal on the first control line, and providing, by the resetting circuitry, a resetting voltage to the conversion control end under the control of a potential at the control end of the resetting circuitry, so that the conversion circuitry controls the first voltage end to be electrically disconnected from the first signal output end under the control of a potential at the conversion control end.

According to the fingerprint detection control method in the embodiments of the present disclosure, at the discharging phase, the control circuitry may provide the switch control signal to the control end of the resetting circuitry under the control of the first control signal, and the resetting circuitry may provide the resetting voltage to the conversion control end under the control of the potential at its control end, so as to prevent the conversion transistor of the conversion circuitry from being turned on in the case of no fingerprint detection. As a result, it is able to prevent the occurrence of a characteristic drift for the conversion transistor, thereby to ensure the performance of the conversion transistor and prolong a period of validity for the fingerprint identification.

In a possible embodiment of the present disclosure, the discharging phase may follow, but not limited to, the fingerprint detection phase.

During the implementation, the sensing circuitry may include a photodiode and a storage capacitor connected in parallel to each other, and the fingerprint detection control method may further include: at the discharging phase, controlling a bias voltage from the bias voltage end to enable a potential at the anode of the photodiode to be equal to a potential at the cathode of the photodiode.

During the implementation, the sensing circuitry may include the photodiode and the storage capacitor connected in parallel to each other. At the discharging phase, the bias voltage from the bias voltage end may be controlled in such a manner that the potential at the anode of the photodiode is equal to the potential at the cathode of the photodiode, so as to disable the photodiode, thereby to ensure the performance of the photodiode and prolong a period of validity for the fingerprint identification.

In some embodiments of the present disclosure, the fingerprint detection control circuit may further include an output circuitry, the fingerprint detection phase may include a resetting time period, a photovoltaic conversion time period and a reading time period arranged sequentially, and the reading time period may be followed by the discharging phase. The fingerprint detection control method may include: at the fingerprint detection phase, enabling, by the control circuitry, the switch control signal end to be electrically disconnected from the control end of the resetting circuitry under the control of the first control signal; within the resetting time period, providing, by the resetting circuitry, a resetting voltage from the resetting voltage end to the conversion control end under the control of a resetting control voltage from the resetting control voltage end; within the photovoltaic conversion time period, stopping, by the resetting circuitry, providing the resetting voltage to the conversion control end under the control of the resetting control voltage, and converting, by the sensing circuitry, a received optical signal into a photovoltage signal and providing the photovoltage signal to the conversion control end; and within the reading time period, controlling, by the conversion circuitry, the first voltage end to be electrically connected to the first signal output end under the control of a potential at the conversion control end, converting the photovoltage signal into a corresponding current signal, and outputting the current signal via the first signal output end, and controlling, by the output circuitry, the first signal output end to be electrically connected to the second signal output end under the control of an output control signal to output the current signal via the second signal output end.

The present disclosure further provides in some embodiments a display device including the above-mentioned fingerprint detection control circuit.

The display device may be any product or member having a display function, e.g., a mobile phone, a tablet computer, a television, a display, a laptop computer, a digital photo frame or a navigator.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A fingerprint detection control circuit, comprising a sensing circuitry, a resetting circuitry, a control circuitry and a conversion circuitry, wherein
the sensing circuitry is electrically connected to a conversion control end, and configured to convert a received optical signal into a photovoltage signal and provide the photovoltage signal to the conversion control end;
the control circuitry is electrically connected to a first control line, a switch control signal end and a control end of the resetting circuitry, and configured to provide a switch control signal from the switch control signal end to the control end of the resetting circuitry under the control of a first control signal on the first control line;
the control end of the resetting circuitry is electrically connected to a resetting control voltage end;
the resetting circuitry is electrically connected to a resetting voltage end and the conversion control end, and configured to provide a resetting voltage from the resetting voltage end to the conversion control end under the control of a potential at the control end of the resetting circuitry;

a control end of the conversion circuitry is electrically connected to the conversion control end; and
the conversion circuitry is electrically connected to a first voltage end and a first signal output end, and configured to control the first voltage end to be electrically connected to or electrically disconnected from the first signal output end under the control of a potential at the conversion control end, convert the photovoltage signal into a corresponding current signal when the first voltage end is electrically connected to the first signal output end, and output the current signal via the first signal output end.

2. The fingerprint detection control circuit according to claim 1, further comprising an output circuitry electrically connected to an output control end, the first signal output end and a second signal output end, and configured to control the first signal output end to be electrically connected to or electrically disconnected from the second signal output end under the control of an output control signal from the output control end.

3. The fingerprint detection control circuit according to claim 1, wherein the sensing circuitry further comprises a photovoltaic conversion sub-circuitry and a storage sub-circuitry connected in parallel to each other, a first end of the photovoltaic conversion sub-circuitry and a first end of the storage sub-circuitry are electrically connected to a bias voltage end, and a second end of the photovoltaic conversion sub-circuitry and a second end of the storage sub-circuitry are electrically connected to the conversion control end, wherein the photovoltaic conversion sub-circuitry is configured to convert a received optical signal into a photocurrent signal, and charge or discharge the storage sub-circuitry through the photocurrent signal to change the potential at the conversion control end.

4. The fingerprint detection control circuit according to claim 1, wherein the control circuitry comprises a control transistor, a control electrode of which is electrically connected to the first control line, a first electrode of which is electrically connected to the switch control signal end, and a second electrode of which is electrically connected to the control end of the resetting circuitry, wherein the switch control signal end is configured to provide the switch control signal.

5. The fingerprint detection control circuit according to claim 1, wherein the resetting circuitry comprises a resetting transistor, a control electrode of which is electrically connected to the control end of the resetting circuitry, a first electrode of which is electrically connected to the resetting voltage end, and a second electrode of which is electrically connected to the conversion control end.

6. The fingerprint detection control circuit according to claim 1, wherein the conversion circuitry comprises a conversion transistor, a control electrode of which is electrically connected to the conversion control end, a first electrode of which is electrically connected to the first voltage end, and a second electrode of which is electrically connected to the first signal output end.

7. The fingerprint detection control circuit according to claim 2, wherein the output circuitry comprises an output transistor, a control electrode of which is electrically connected to the output control end, a first electrode of which is electrically connected to the first signal output end, and a second electrode of which is electrically connected to the second signal output end.

8. The fingerprint detection control circuit according to claim 3, wherein the photovoltaic conversion sub-circuitry comprises a photodiode, the storage sub-circuitry comprises a storage capacitor, an anode of the photodiode is electrically connected to the bias voltage end, a cathode of the photodiode is electrically connected to the conversion control end, a first end of the storage capacitor is electrically connected to the bias voltage end, and a second end of the storage capacitor is electrically connected to the conversion control end.

9. A fingerprint detection control method for the fingerprint detection control circuit according to claim 1, comprising, at a discharging phase, providing, by the control circuitry, a switch control signal to the control end of the resetting circuitry under the control of a first control signal on the first control line, and providing, by the resetting circuitry, a resetting voltage to the conversion control end under the control of a potential at the control end of the resetting circuitry, so that the conversion circuitry controls the first voltage end to be electrically disconnected from the first signal output end under the control of a potential at the conversion control end.

10. The fingerprint detection control method according to claim 9, wherein a fingerprint detection phase is followed by the discharging phase.

11. The fingerprint detection control method according to claim 9, wherein the sensing circuitry comprises a photodiode and a storage capacitor connected in parallel to each other, and the fingerprint detection control method further comprises: at the discharging phase, controlling a bias voltage from the bias voltage end, to enable a potential at the anode of the photodiode to be equal to a potential at the cathode of the photodiode.

12. The fingerprint detection control method according claim 9, wherein the fingerprint detection control circuit further comprises an output circuitry, the fingerprint detection phase comprises a resetting time period, a photovoltaic conversion time period and a reading time period arranged sequentially, and the reading time period is followed by the discharging phase, wherein the fingerprint detection control method comprises:
at the fingerprint detection phase, enabling, by the control circuitry, the switch control signal end to be electrically disconnected from the control end of the resetting circuitry under the control of the first control signal;
within the resetting time period, providing, by the resetting circuitry, a resetting voltage from the resetting voltage end to the conversion control end under the control of a resetting control voltage from the resetting control voltage end;
within the photovoltaic conversion time period, stopping, by the resetting circuitry, providing the resetting voltage to the conversion control end under the control of the resetting control voltage, and converting, by the sensing circuitry, a received optical signal into an photovoltage signal and providing the photovoltage signal to the conversion control end; and
within the reading time period, controlling, by the conversion circuitry, the first voltage end to be electrically connected to the first signal output end under the control of a potential at the conversion control end, converting the photovoltage signal into a corresponding current signal, and outputting the current signal via the first signal output end, and controlling, by the output circuitry, the first signal output end to be electrically connected to the second signal output end under the control of an output control signal to output the current signal via the second signal output end.

13. A display device, comprising the fingerprint detection control circuit according to claim 1.

14. The display device according to claim 13, wherein the fingerprint detection control circuit further comprises an output circuitry electrically connected to an output control end, the first signal output end and a second signal output end, and configured to control the first signal output end to be electrically connected to or electrically disconnected from the second signal output end under the control of an output control signal from the output control end.

15. The display device according to claim 13, wherein the sensing circuitry further comprises a photovoltaic conversion sub-circuitry and a storage sub-circuitry connected in parallel to each other, a first end of the photovoltaic conversion sub-circuitry and a first end of the storage sub-circuitry are electrically connected to a bias voltage end, and a second end of the photovoltaic conversion sub-circuitry and a second end of the storage sub-circuitry are electrically connected to the conversion control end, wherein the photovoltaic conversion sub-circuitry is configured to convert a received optical signal into a photocurrent signal, and charge or discharge the storage sub-circuitry through the photocurrent signal to change the potential at the conversion control end.

16. The display device according to claim 13, wherein the control circuitry comprises a control transistor, a control electrode of which is electrically connected to the first control line, a first electrode of which is electrically connected to the switch control signal end, and a second electrode of which is electrically connected to the control end of the resetting circuitry, wherein the switch control signal end is configured to provide the switch control signal.

17. The display device according to claim 13, wherein the resetting circuitry comprises a resetting transistor, a control electrode of which is electrically connected to the control end of the resetting circuitry, a first electrode of which is electrically connected to the resetting voltage end, and a second electrode of which is electrically connected to the conversion control end.

18. The display device according to claim 13, wherein the conversion circuitry comprises a conversion transistor, a control electrode of which is electrically connected to the conversion control end, a first electrode of which is electrically connected to the first voltage end, and a second electrode of which is electrically connected to the first signal output end.

19. The display device according to claim 14, wherein the output circuitry comprises an output transistor, a control electrode of which is electrically connected to the output control end, a first electrode of which is electrically connected to the first signal output end, and a second electrode of which is electrically connected to the second signal output end.

20. The display device according to claim 15, wherein the photovoltaic conversion sub-circuitry comprises a photodiode, the storage sub-circuitry comprises a storage capacitor, an anode of the photodiode is electrically connected to the bias voltage end, a cathode of the photodiode is electrically connected to the conversion control end, a first end of the storage capacitor is electrically connected to the bias voltage end, and a second end of the storage capacitor is electrically connected to the conversion control end.

* * * * *